Inventors
MARVIN WEISS
VINCENT MAIELI
WALTER OPPEN
By Borst and Borst Attorneys

United States Patent Office 2,985,023
Patented May 23, 1961

2,985,023

DRIFT COMPENSATED PLATFORM

Marvin Weiss, Pearl River, Vincent Maieli, North Bellmore, and Walter R. Oppen, Plandome, N.Y., assignors to Sperry Rand Corporation, Ford Instrument Company Division, Wilmington, Del., a corporation of Delaware Filed Sept. 29, 1960, Ser. No. 59,415

10 Claims. (Cl. 74—5.34)

This invention relates to gyro systems and particularly to improvements in the use of gyros to stabilize a platform with respect to inertial space.

It is known that gyros drift from their space orientation due to an unbalanced torque about their output axes. It is the purpose of this invention to provide means for detecting the inherent drift of a stabilizing gyro and generating a compensating torque therefor. Generally this is accomplished by modulating the angular momentum of the rate gyro disposed relative to each of the axes of the stabilized platform, deriving the compensating torques from the resulting alternating component of the rate gyro output and applying the compensating torques to the stabilizing gyros.

According to the invention there is provided an improved rate gyro network which is highly sensitive to the angular movement of the stabilized platform to which it is physically related. The rate gyro network may be associated with systems other than stabilized platforms such as gyro compasses and the like.

One object of the invention is to provide a gyro stabilized platform which employs an internal reference to generate and apply drift compensating signals.

Another object of the invention is to provide an improved rate gyro network.

Figure 1:
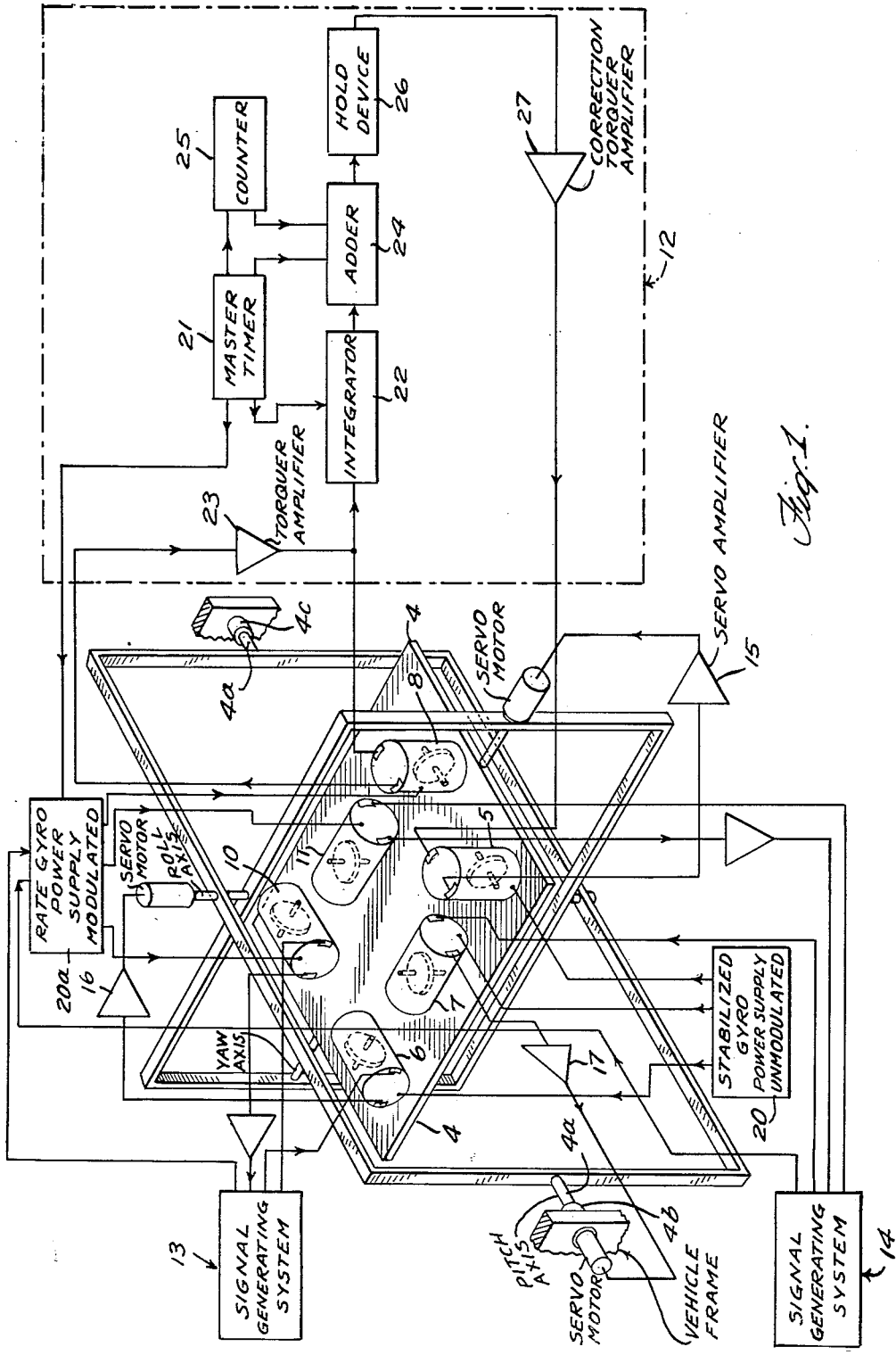
Figure 2:
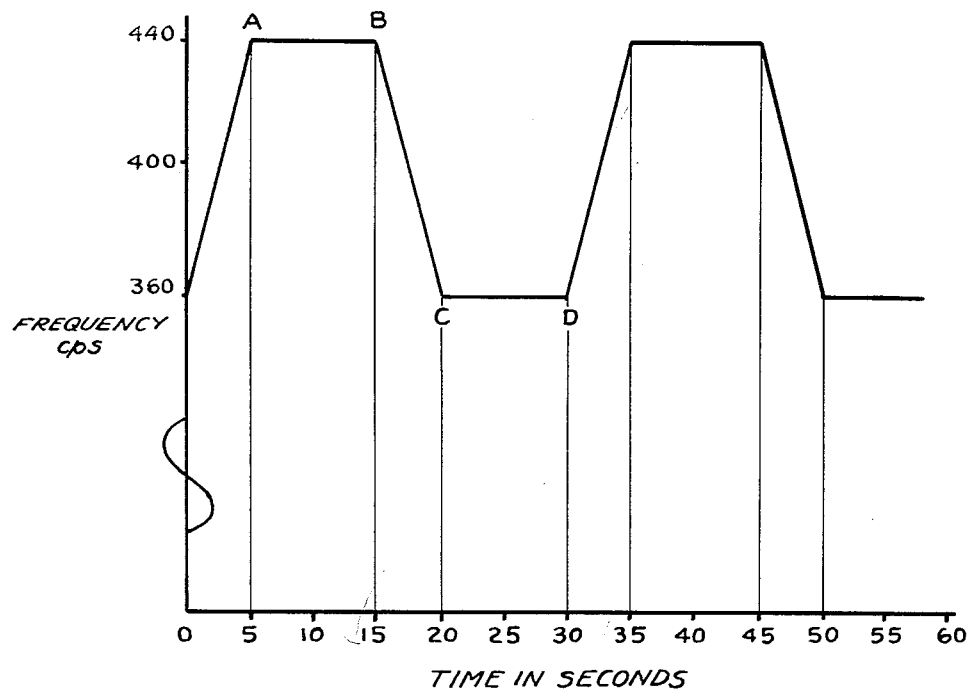

Other objects and advantages of the invention may be appreciated on reading the following detailed description of one embodiment which is taken in conjunction with the accompanying drawings, in which Fig. 1 is a view of the gyro stabilized platform, including a block diagram of the drift compensating signal generating system, and Fig. 2 is a diagram showing the modulated frequency change with time.

Referring to Fig. 1 the gyro stabilized platform includes a member 4 having a stabilizing gyro 5 about its yaw axis, a stabilizing gyro 6 about its roll axis and a stabilizing gyro 7 about its pitch axis. The stabilized member 4 is free to pivot about the gimbal pivots allowing the vehicle in which it is mounted to rotate while it maintains a fixed angular position in inertial space. The mounting is effected through gimbal shaft 4a which is journalled in bearings 4b and 4c affixed to the vehicle body. In addition, the platform supports a rate gyro 8, which is sensitive to drift about the yaw axis, a rate gyro 10, which is sensitive to drift about the roll axis, and a rate gyro 11 which is sensitive to drift about the pitch axis. A drift compensating signal generating system 12 is connected between the stabilizing gyro 5 and the rate gyro 8. Also, a drift compensating signal generating system 13 is connected between the stabilizing gyro 6 and the rate gyro 10. Similarly, a drift compensating signal generating system 14 is connected between the stabilizing gyro 7 and the rate gyro 11.

The servo amplifier 15 contains the necessary stabilizing networks consistent with the character of the stabilizing gyro 5 and sends a signal required to stabilize the platform about the yaw axis. Similarly, a servo amplifier 16 is connected to the gyro 6 to stabilize the platform about the roll axis and servo amplifier 17 is energized by the gyro 7 to stabilize the platform about the pitch axis.

As shown in Fig. 1, there is an unmodulated power supply 20 which energizes the three stabilizing gyros 5, 6 and 7 and a frequency modulated power supply 20a which energizes the three rate gyros 8, 10 and 11. The output frequency of the supply 20a is modulated with a trapezoidal envelope and a frequency deviation of 20% as illustrated in Fig. 2. The period of modulation will depend on the rate at which the rate gyro can be accelerated and decelerated. For example, the frequency will vary in the following manner (see Fig. 2). At the start of a period, it will be 360 cps. It will then increase linearly to 440 cps. in five seconds. It will then remain at 440 cps. for ten seconds and decrease linearly to 360 cps. in five seconds. It will then remain at 360 cps. for ten seconds to complete the cycle. The modulated power supply 20a is synchronized by means of a master timer 21 which also controls the sequence of events in the synchronous integrator 22 which integrates the output of the torquer amplifier 23.

The rate gyro 8 is oriented to measure the drift rate of the platform 4 about the yaw axis gimbal with respect to inertial space. The torquer amplifier 23 is a linear amplifier whose output is proportional to both the angular momentum and rate of rotation of the rate gyro. The output voltage of this amplifier contains an alternating signal directly proportional to the disturbance torque of the stabilizing gyro. In addition the output of the rate gyro torquer amplifier contains components due to the inherent errors in the rate gyro. This voltage is integrated in an integrating servo 22 during the period from A to B as indicated in Fig. 2. At this time the integration is stopped and the frequency is changed from 440 cps. to 360 cps. The direction of rotation of the integrating servo is then reversed and the integration allowed to continue from time C to time D. The output of the integrator due to the disturbance torque of the rate gyro will now be zero but the output due to the drift of the stabilization gyro will be large. Essentially the action is similar to that of a demodulation where the output for an input which has the same frequency as the reference is a D.C. signal while the output for any other frequency input is zero. The synchronous integrator acts like a very narrow band filter which passes only the modulation frequency. An adder 24 is connected to the output of the integrator 22 and a counter 25 is disposed between the master timer 21 and the adder 24. The function of the counter 25 and adder 24 is to permit carrying the integration process over a number of cycles of modulation rather than over one cycle. The output of integration at the end of each cycle is added to the previously stored values up to a fixed number of cycles as determined by the counter and as required by the signal to noise improvement that is necessary.

The output of the adder at the end of "$n$" cycles is proportional to the torque necessary to compensate for the steady drift of the stabilizing gyro. This output is applied to a hold device 26 which preserves the signal during the next "$n$" cycles and applies the correcting torque to the stabilizing gyro via a torquer amplifier 27 during the next "$n$" cycles. The steady drift of the stabilizing gyro is thus reduced by an amount depending on the sensitivity of the system. The integrator, counter, adder and hold blocks are standard circuits which are in wide use in a large number of control applications.

In general, stabilizing gyros will drift due to unavoidable residual torques about their output axis at an angular rate $\omega_s$ as defined by:

(1) $$\omega_s = \frac{T_s}{H_s}$$

where $T_s$ is the unbalanced torque about the output axis of the stabilizing gyro.
$H_s$ is the angular momentum of the gyro wheel of the stabilizing gyro.
$\omega_s$ is the resulting drift about the stabilized axis.

To detect this drift a rate gyro is mounted to measure the rate of rotation about the stabilized axis. Due to the drift rate there will be a torque generated about the rate gyro output axis equal to:

(2) $\qquad T_r = H_r \omega_s$ where $T_r$ is the output torque of the rate gyro.
$H_r$ is angular momentum of the rate gyro.
$\omega_s$ is the input drift rate of the stabilized platform.

In addition to the above there will also be a residual torque about the output axis of the rate gyro which is due to unbalanced torque about its output its output axis. The total torque about the output axis of the rate gyro is the sum of the component due to drift of the stabilization gyro and the component due to unbalanced torque of the rate gyro as defined by:

(3) $\qquad T_r = H_r \omega_s + T_u$ where $T_u$ is the unbalanced torque.
$T_r$ is the total torque.

If the value of the angular momentum of the rate gyro $H_r$ is changed by an amount $\Delta H_r$ to $[H_r(1+\Delta)]$ there will be a change in $T_r$ to a new value $T_r'$ as defined by:

(4) $\qquad T_r' = H_r(1+\Delta)\omega_s + T_u$

Taking the difference in the output torque of the rate gyro at the two values of $H_r$:

(5) $\qquad T_r' - T_r = \Delta H \omega_s$ and solving for $\omega_s$ we obtain:

(6) $\qquad \omega_s = \dfrac{T_r' - T_r}{\Delta H_r}$

Equation 6 indicates that the effect of the unbalanced torque of the rate gyro can be eliminated and the drift rate measured directly. The values of $\Delta$ and $H_r$ are known system constants while $T_r'$ and $T_r$ are computed from measurements of the rate gyro output.

A method of measuring the alternating component of the rate gyro output in the presence of noise is as follows: Starting at the beginning of a modulation cycle the output of the rate gyro is integrated by means of an integrating servo. At the end of a half cycle of modulation the direction of the integration is reversed and the integration allowed to continue until the end of the cycle. If the average torquer amplifier output was greater during the first half cycle than during the second half cycle the output of the integrator at the end of the cycle will not be zero but some finite value whose amplitude is proportional to the difference between the output voltage in the two half cycles. Since the noise components due to a variety of causes including torques about the rate gyro output axis are not synchronous with the modulation, their average value is zero. The noise components will, therefore, be attenuated by being passed through the synchronous integrator. The improvement in the signal to noise ratio will be proportional to the square root of the number of cycles over which the integration is carried out. Having measured the disturbance torque of the stabilizing gyro a torque is applied about the sensitive axis to reduce the drift to a small value.

Various modifications of the invention as above described, which employ the technique of drift detection and measurement by modulating angular momentum may be effected by persons skilled in the art without departing from the scope and principle of invention as defined in the following claims.

What is claimed is:

1. A drift compensated gyro system comprising a platform stabilized with respect to each of its mutually perpendicular axes, a rate gyro arranged with respect to each of said axes, a frequency modulated power supply for said rate gyros, a drift compensating signal generating system connected between each rate gyro and its axis corresponding stabilizing gyro including an integrator, means for synchronizing said integrator and said modulated power supply and for cyclically reversing the direction of the integrating operation performed by said integrator, a hold device disposed between said integrator and the stabilizing gyro.

2. A drift compensated gyro system comprising a platform, a stabilizing gyro oriented with respect to each of the three mutually perpendicular axes of said platform, a rate gyro oriented with respect to each of said axes, a frequency modulated power supply for said rate gyro, a drift compensating signal generating system connected between each rate gyro and its axis corresponding stabilizing gyro including an integrator, a master timer synchronizing said integrator and said modulated power supply and cyclically reversing the integrating operation performed by said integrator, an adder connected to said integrator and to said timer, a counter disposed between said timer and said adder and a hold device connected to said adder.

3. A rate gyro system comprising a rate gyro, a frequency modulated power supply for said rate gyro, an integrator connected to said rate gyro, means for synchronizing said integrator and said modulated power supply and cyclically reversing the integrating operation performed by said integrator and a hold device connected to the output of said integrator.

4. A rate gyro system comprising a rate gyro, a frequency modulated power supply for said rate gyro, an integrator connected to said rate gyro, means for synchronizing said integrator and said modulated power supply and cyclically reversing the integrating operation performed by said integrator and an adder connected to said integrator and to said synchronizing means, a counter disposed between said synchronizing means and said adder and a hold device connected to the ouptut of said adder.

5. A drift compensated gyro system of the character described comprising a platform, means adapted to be carried by a vehicle by which said platform is mounted for rotation about the yaw, roll, and pitch axes of said platform, and compensating means by which a fixed angular position of said platform with respect to inertial space is maintained during rotation of said vehicle; said compensating means comprising, a yaw axis servo motor which is operative to rotate said platform about the yaw axis thereof, a roll axis servo motor which is operative to rotate said platform about the roll axis thereof, a pitch axis servo motor which is operative to rotate said platform about the pitch axis thereof, a yaw axis stabilizing gyro and a yaw axis rate gyro which are mounted on said platform in oriented relation with respect to said yaw axis with the axes of rotation of the rotors of said yaw axis stabilizing and rate gyros being disposed perpendicular to said yaw axis, a roll axis stabilizing gyro and a roll axis rate gyro which are mounted on said platform in oriented relation with respect to said roll axis with the axes of rotation of the rotors of said roll axis stabilizing and rate gyros being disposed perpendicular to said roll axis, a pitch axis stabilizing gyro and a pitch axis rate gyro which are mounted on said platform in oriented relation with respect to said pitch axis with the axes of rotation of the rotors of said pitch axis stabilizing and rate gyros being disposed perpendicular to said pitch axis, an unmodulated power supply and means connecting said unmodulated power supply to each of said stabilizing gyros, a modulated power supply and means connecting said modulated power supply to each of said rate gyros, said yaw axis stabilizing and rate gyros being operative to detect any drift of said platform about the yaw axis thereof and to effect the imparting of a corresponding correction signal to said yaw axis servo motor, said roll axis stabilizing and rate gyros being operative to detect any drift of said platform about the roll axis thereof and to effect the imparting of a corresponding signal to said roll axis servo motor, and said pitch axis stabilizing and rate gyros being operative to detent any drift of said platform about the pitch axis thereof and to effect the imparting of a corresponding correction signal to said pitch axis servo motor.

6. A drift compensated gyro system of the character described comprising a platform, means adapted to be carried by a vehicle by which said platform is mounted for rotation about the yaw, roll, and pitch axes of said platform, and compensating means by which a fixed angular position of said platform with respect to inertial space is maintained during rotation of said vehicle; said compensating means comprising, a yaw axis servo motor which is operative to rotate said platform about the yaw axis thereof, a roll axis servo motor which is operative to rotate said platform about the roll axis thereof, a pitch axis servo motor which is operative to rotate said platform about the pitch axis thereof, a yaw axis stabilizing gyro and a yaw axis rate gyro which are mounted on said platform in oriented relation with respect to said yaw axis with the axes of rotation of the rotors of said yaw axis stabilizing and rate gyros being disposed perpendicular to said yaw axis, a roll axis stabilizing gyro and a roll axis rate gyro which are mounted on said platform in oriented relation with respect to said roll axis with the axes of rotation of the rotors of said roll axis stabilizing and rate gyros being disposed perpendicular to said roll axis, a pitch axis stabilizing gyro and a pitch axis rate gyro which are mounted on said platform in oriented relation with respect to said pitch axis with the axes of rotation of the rotors of said pitch axis stabilizing and rate gyros being disposed perpendicular to said pitch axis, a first drift compensating signal generating system which is connected between said yaw axis stabilizing and rate gyros, a second drift compensating signal generating system which is connected between said roll axis stabilizing and rate gyros, a third drift compensating signal generating system which is connected between said pitch axis stabilizing and rate gyros, an unmodulated power supply connected to each of said stabilizing gyros, a modulated power supply and means connecting said modulated power supply to each of said rate gyros and to each of said drift compensating signal generating systems, said yaw axis stabilizing and rate gyros being operative to detect any drift of said platform about the yaw axis thereof and in cooperation with said first drift compensating signal generating system to impart a corresponding correction signal to said yaw axis servo motor, said roll axis stabilizing and rate gyros being operative to detect any drift of said platform about said roll axis and in cooperation with said second drift compensating signal generating system to impart a corresponding correction signal to said roll axis servo motor, and said pitch axis stabilizing and rate gyros being operative to detect any drift of said platform about the pitch axis thereof and in cooperation with said third drift compensating signal generating system to impart a corresponding correction signal to said pitch axis servo motor.

7. A drift compensated gyro system as defined by claim 6 in which each of said drift compensating signal generating systems comprises an integrator, means for synchronizing said integrator and said modulated power supply and for cyclically reversing the direction of the integrating operation performed by said integrator, and a hold device disposed between said integrator and the stabilizing gyro associated therewith.

8. A drift compensated gyro system as defined by claim 6 in which each of said drift compensating signal generating systems comprises an integrator, a master timer synchronizing said integrator and said modulated power supply and for cyclically reversing the integrating operation performed by said integrator, an adder connected to said integrator and to said timer, a counter disposed between said timer and said adder, and a hold device connected to said adder.

9. A drift compensated gyro system as defined by claim 6 in which each of said drift compensating signal generating systems comprises an integrator connected to the associated rate gyro, means for synchronizing said integrator and said modulated power supply and for cyclically reversing the integrating operation performed by said integrator, and a hold device connected to the output of said integrator.

10. A drift compensated gyro system as defined by claim 6 in which each of said drift compensating signal generating systems comprises an integrator connected to the associated rate gyro, means for synchronizing said integrator and said modulated power supply and for cyclically reversing the integrating operation performed by said integrator, an adder connected to said integrator and to said synchronizing means, a counter disposed between said synchronizing means and said adder, and a hold device connected to the output of said adder.

References Cited in the file of this patent

UNITED STATES PATENTS

| | | |
|---|---|---|
| 2,928,282 | La Hue | Mar. 15, 1960 |
| 2,941,406 | Singleton et al. | June 21, 1960 |